(12) United States Patent
Roy-Chowdhury et al.

(10) Patent No.: US 8,671,273 B2
(45) Date of Patent: Mar. 11, 2014

(54) METHOD OF PERFORMANCE-AWARE SECURITY OF UNICAST COMMUNICATION IN HYBRID SATELLITE NETWORKS

(75) Inventors: Ayan Roy-Chowdhury, Silver Spring, MD (US); John S. Baras, Potomac, MD (US)

(73) Assignee: The University of Maryland, College Park, MD (US)

( * ) Notice: Subject to any disclaimer, the term of this patent is extended or adjusted under 35 U.S.C. 154(b) by 122 days.

(21) Appl. No.: 13/088,315

(22) Filed: Apr. 15, 2011

(65) Prior Publication Data

US 2011/0289311 A1    Nov. 24, 2011

Related U.S. Application Data

(60) Provisional application No. 61/324,631, filed on Apr. 15, 2010.

(51) Int. Cl.
*H04L 29/06*  (2006.01)
*H04L 9/32*   (2006.01)
*G06F 17/00*  (2006.01)
*G06F 12/14*  (2006.01)

(52) U.S. Cl.
USPC ........... 713/153; 713/156; 713/160; 713/168; 713/171; 726/12; 726/14; 726/23

(58) Field of Classification Search
USPC ................. 713/151, 153, 156, 160, 168, 171; 726/12, 14, 23
See application file for complete search history.

(56) References Cited

U.S. PATENT DOCUMENTS

2006/0143700 A1*  6/2006  Herrmann ...................... 726/14
2007/0245140 A1* 10/2007  Sakaguchi ..................... 713/160
2009/0158040 A1*  6/2009  Chaudhary et al. ........... 713/171

* cited by examiner

*Primary Examiner* — Aravind Moorthy
(74) *Attorney, Agent, or Firm* — Nixon & Vanderhye PC (57) ABSTRACT

A method and apparatus utilizes Layered IPSEC (LES) protocol as an alternative to IPSEC for network-layer security including a modification to the Internet Key Exchange protocol. For application-level security of web browsing with acceptable end-to-end delay, the Dual-mode SSL protocol (DSSL) is used instead of SSL. The LES and DSSL protocols achieve desired end-to-end communication security while allowing the TCP and HTTP proxy servers to function correctly.

20 Claims, 7 Drawing Sheets

METHOD OF PERFORMANCE-AWARE SECURITY OF UNICAST COMMUNICATION IN HYBRID SATELLITE NETWORKS

CROSS-REFERENCES TO RELATED APPLICATIONS

This application claims the benefit of Application Ser. No. 61/324,631 filed on Apr. 15, 2010 which is incorporated herein by reference in its entirety.

GOVERNMENT SUPPORT

The subject matter disclosed herein was made with government funding and support under NCC8235 awarded by NASA. The government has certain rights in this invention.

FIELD OF TECHNOLOGY

The exemplary implementations described herein relate to methods for securing end-to-end communication in hybrid satellite networks.

BACKGROUND

Satellite links suffer from longer propagation delays compared to terrestrial links The delay can be as high as 500 ms round-trip for a geostationary satellite link. Most Internet traffic uses the Transmission Control Protocol (TCP), which is highly susceptible to the delay-bandwidth product and exhibits very poor performance in satellite channels.

To mitigate the negative effects of the satellite propagation delay on Internet traffic, commercial satellite networks usually implement a split-connection TCP Performance Enhancing Proxy (PEP). A PEP agent is installed at the satellite gateway between the satellite network and the Internet. The PEP agent inspects every TCP packet that flows through the network and sends back premature acknowledgments to the TCP senders. Studies have shown that this technique leads to significant performance improvement in satellite networks.

Commercial satellite networks also employ HTTP proxy servers, at the central hub and each client location, to improve the speed of response to web browsing requests for Internet traffic. When the remote client makes a request for a webpage, the web server responds with the requested base HTML page. The hub HTTP proxy server intercepts and reads the web page and sends multiple GET requests to the destination web server to retrieve all the embedded objects in the base page. This exchange occurs over a high-speed terrestrial connection between the hub and the Internet, thereby saving the time each request would have needed for a round trip over the satellite link. As the objects are retrieved by the hub, they are immediately forwarded to the client proxy. The client browser GET requests are terminated at the local proxy server, which forwards the pre-fetched documents to the client browser immediately. The net result is that only a single GET request from the user browser traverses the satellite link, while a set of rapid responses quickly deliver the requested webpage and associated elements to the browser.

Two protocols that are widely used for secure unicast communication are the Internet Security Protocol (IPSEC) and the Secure Socket Layer (SSL) protocol.

IPSEC creates an end-to-end secure channel at the network layer for the secure transfer of traffic between two end users. The problem with using IPSEC in satellite networks is that it disables the functionality of the PEPs. The IP packet payload, which includes the TCP header, is encrypted with keys known only to the end points. Therefore a TCP PEP, which is an intermediate node in the communication path, cannot read or modify the TCP header, since the PEP does not know the keys. Consequently the PEP cannot function, leading to a degradation in the performance of the TCP protocol.

The Secure Socket Layer (SSL), on the other hand, operates above the transport layer in the protocol stack and establishes a secure HTTP (HTTPS) session on a need basis. SSL encrypts the TCP payload (the application layer HTTP data) between the client and the server, but the TCP header is transmitted in the clear. Therefore the TCP PEPs can function correctly with SSL. However, the HTML webpage encrypted into SSL records are readable only by the client and the server who have the decryption keys. The keys are not available to the HTTP proxy, and therefore the HTTP proxy cannot read the HTML webpage. Consequently, HTML object pre-fetching by the hub proxy server cannot take place. The net result is that a web page with n−1 embedded objects takes n*RTT to get loaded, an increase in delay by a factor of n.

SUMMARY

The exemplary implementation described herein provide solutions that allow IPSEC and SSL to work in conjunction with TCP and HTTP proxy servers in hybrid satellite networks, so that the unicast communication is secured without sacrificing the performance optimization algorithms. These solutions were obtained by considering prospective candidate protocols and evaluating their performance through simulations.

The Layered IPSEC protocol is proposed to be used as an alternative to IPSEC and also proposed are modifications to the Internet Key Exchange protocol that is used by IPSEC for dynamic session establishment. The Dual-Mode SSL protocol is proposed as an alternative to SSL. Performance analysis of the proposed protocols are provided below together with optimized versions of the Dual-mode SSL.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION

Figure 1A:
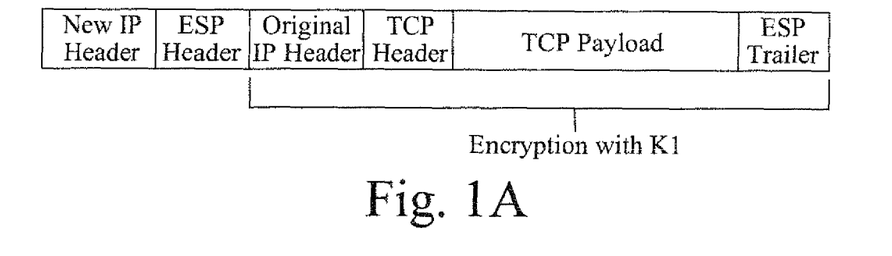
FIG. 1A depicts packet format for original IPSEC ESP tunnel mode encryption.
Figure 1B:
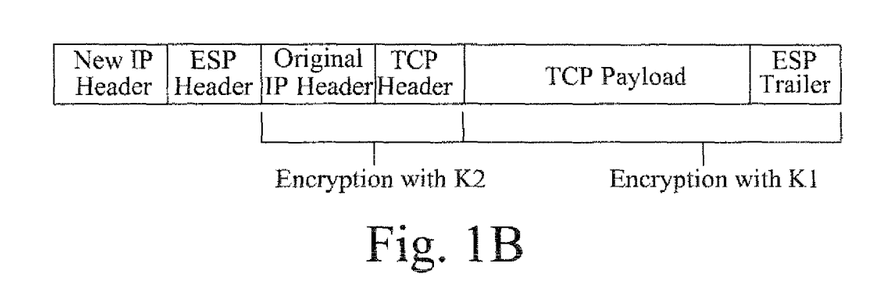
FIG. 1B depicts packet format for Layered IPSEC ESP tunnel mode encryption.

For network layer encryption and integrity protection, it was determined to use the Layered IPSEC Security protocol (LES), which is based on the concept of breaking the IPSEC encryption in multiple encryption regions or zones on a single packet basis. The method has been proposed independently for enhancing TCP performance and security in wireless networks. Known as multilayer IPSEC or ML-IPSEC, and Layered IPSEC (LES), the idea is to encrypt different regions of the IP packet using different keys as shown in FIG. 1B. The TCP payload is encrypted with key K1 which is shared only between the endpoints. The original IP header and the TCP header are encrypted with key K2 which is shared by the endpoints with intermediate authorized nodes like the TCP PEP. Therefore a TCP PEP can decrypt the header portion of the ESP packet with K2 and read the TCP header to do its performance optimizations. But the PEP cannot read the TCP payload and therefore cannot access the actual data since it does not posses the key K1.

The correctness of operation of LES has been established in the prior art in that its performance is comparable to IPSEC for the specific cryptographic algorithms used. The prior art has also established that the throughput overhead of ML-IPSEC in a simple test-bed is 2%-7% compared to IPSEC.

It was postulated that the LES approach would be an effective security solution in hybrid satellite networks that would allow TCP PEPs to function effectively. However, LES introduces higher complexity and higher communication overhead compared to IPSEC in the establishment of the secure channel that now requires co-ordination not only between the end points, but also with the proxy servers. Therefore an investigation was carried out regarding the performance of end-to-end traffic when LES is implemented in conjunction with TCP PEP optimizations in a hybrid satellite network, and compared to the case where IPSEC is implemented (and therefore the TCP PEPs cannot function).

The prior art assumed pre-shared keys between the end points and the TCP PEP to establish the secure channel. However, in situations when the IPSEC encryption keys are dynamically determined at the time of establishing the secure channel, the Internet Key Exchange (IKE) is used to generate the keys. IKE performs a series of handshakes between the end points to establish the two keys used by IPSEC for encryption/decryption and two keys for authentication (the usage of the keys in IPSEC is uni-directional).

IKE operates in two phases—phase 1 and phase 2. The phase 1 exchange happens once and it creates a security association that allows multiple phase 2 connections to be set up between the client and the server. The phase 1 exchange can happen in either the main mode, in which there are 3 pairs of message exchanges between the end points, or in the aggressive mode, in which all the exchanges are condensed into a total of 3 messages.

Figure 2:
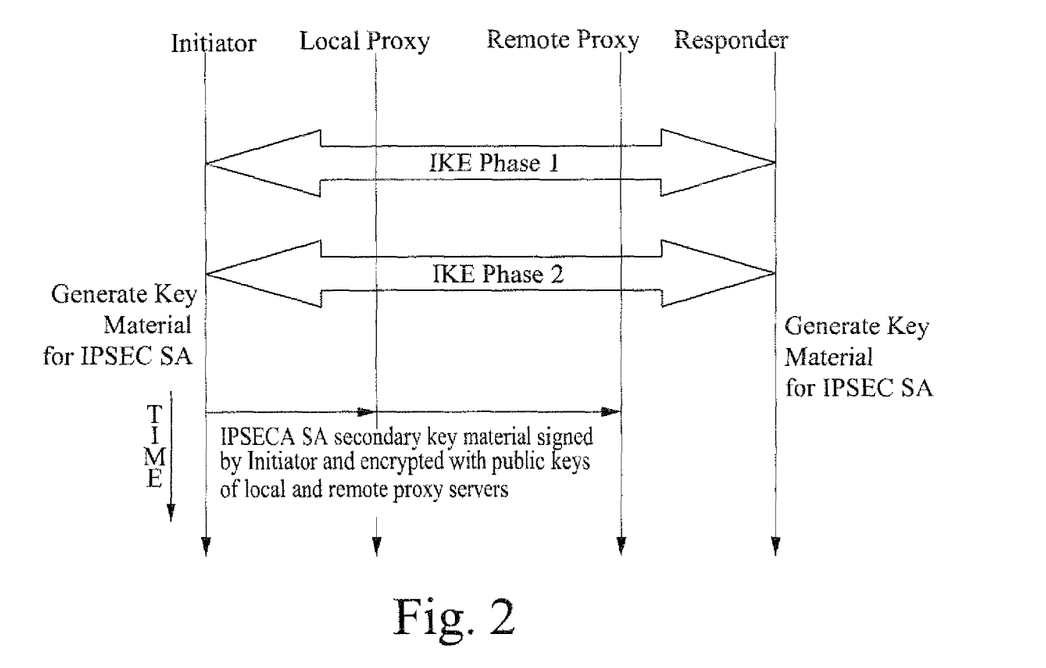
FIG. 2 illustrates a modification of IKE phase 2.

In IKE phase 2 quick mode, there is a total of 3 exchanges between the initiator and the responder peers, during which the two parties verify the keying material that each will use for the session. The phase 2 exchange uses the session keys established in phase 1 to do mutual authentication and establish a phase 2 session key. Based on the phase 2 session key, the two end points agree on a set of four keys used by IPSEC.

in the exemplary implementations the IKE protocol was modified to incorporate the generation of additional keys needed for LES. In the modified protocol, in IKE phase 1 the initiator entity (which would be the remote client node in the present scenario) includes the certificates of the remote and hub proxy nodes in the protection mechanism negotiation stage with the responder entity (the server node in in the present scenario). The keying data that is exchanged between the end points in the modified IKE phase 1 is subsequently used in IKE phase 2, so that the client and the server agree on a set of six keys—the four keys for forward and reverse encryption and authentication between the client and server, and two additional keys to be used by the sender to perform layered encryption on the IP header and also layered authentication. The exemplary implementations add a fourth message dissemination to IKE phase 2, in which the client distributes the two additional keys to the local and remote proxy servers. The client encrypts the IP header encryption keys using the public keys of the proxy servers (it is assumed that the public keys and certificates of the proxy servers are available to the client), authenticates the message using a digital signature, and sends the authenticated message to the proxy servers. FIG. 2 illustrates the step added to IKE phase 2 for key management for LES.

Additionally, the exemplary implementations use only the aggressive mode of IKE phase 1 exchange, and the quick mode of IKE phase 2 exchange. This is to contain the negative effect of the long round-trip delay on the overall performance—to ensure that the delay incurred due to the IKE message exchanges do not neutralize the advantages that might be gained due to the use of LES. The IKE phase 1 aggressive mode will reduce the delay by 50%, compared to the IKE phase 1 main mode. As will be described below, whether that is sufficient savings is evaluated through simulations.

Figure 3:
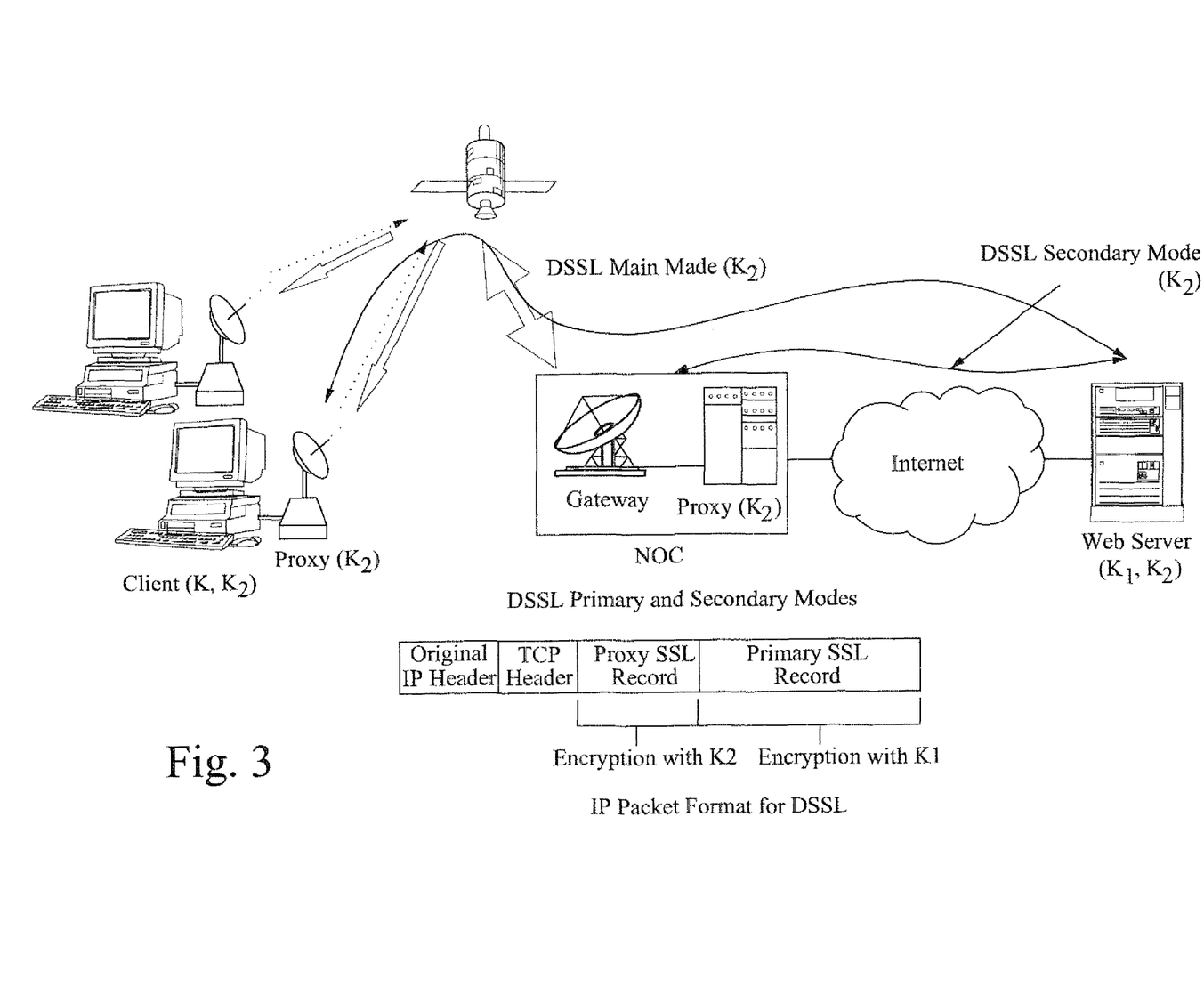
FIG. 3 illustrates the use of Dual Mode SSL for HTTP optimization.

When the HTTP traffic is secured using SSL and the security policy does not allow for trusted third parties, the use of a modified SSL protocol, the Dual-Mode SSL (DSSL) protocol is proposed. As shown in FIG. 3, the secure connection in DSSL has two modes—an end-to-end main mode connection between the client and the web server, and a secondary mode connection that has the hub HTTP proxy as an intermediate node. The security parameters for both modes are negotiated between the client and the server. Since DSSL extends the SSL protocol to include support for HTTP proxy servers, the message structures and many of the protocol steps are similar. DSSL introduces a series of additional message exchanges between the client and the HTTP proxy server, and between the proxy server and the web server. The various stages of the DSSL protocol are described below.

Stage 1: Client-Proxy Handshake Phase 1.

When a remote client wants to establish a secure session for the very first time, it might not be aware of the security parameters of the HTTP proxy. It therefore establishes a connection to the HTTP proxy and initiates the first stage of the DSSL protocol, the client-proxy handshake phase 1. In this phase the client sends its security certificate to the HTTP proxy, which in turn responds with its own security certificate. The client thus obtains the public key of the HTTP proxy server from the proxy's certificate. The start and end of the communication in each phase is marked by a "Hello" and a "Done" message respectively, for each of the participating entities. This is in accordance with the original SSL protocol.

Stage 2: Client-Server Handshake.

Once the client has obtained the security certificate of the HTTP proxy, it contacts the web server to exchange security credentials and to establish the session keys for the secure web session. This stage is similar to the SSL protocol, with two exceptions—(i) the client sends both its own certificate and the HTTP proxy certificate to the web server, and (ii) in the key exchange step, the client generates both primary and secondary keys and sends them to the web server.

Stage 3: Client-Proxy Handshake Phase 2.

After the client and the web server have established the session keys in the second stage, the client again contacts the HTTP proxy and instructs it to obtain the session keys from the web server.

Stage 4: Proxy-Web Server Handshake.

The HTTP proxy contacts the web server and sends its certificate to authenticate itself. Upon correct authentication, the web server sends the secondary session key to the HTTP proxy.

Stage 5: Client-Proxy Handshake Phase 3.

This final stage of the key establishment protocol is essentially a continuation of the client-proxy handshake phase 2. After the proxy obtains the secondary key from the web server, it contacts the client to confirm that it has received the key. The establishment of the primary and secondary keys between the client, the web server and the proxy is now complete.

All the message exchanges in DSSL are authenticated using digital certificates.

Let K1 be the encryption key for the main mode, and K2 be the encryption key for the secondary mode. When the client makes an HTTPS request, the client proxy sends local replies to the client browser. The web server, on receiving the request, parses the requested HTML page to obtain the embedded object links, which are collated into a new HTML page. The object links HTML page is then encrypted by DSSL using K2 to create the proxy SSL record. DSSL encrypts the base HTML page using K1 to create the primary SSL record. The two records are appended together and sent to the client in an IP packet (FIG. 3). The hub proxy intercepts the IP packet, extracts the object links from the proxy SSL record using K2, and pre-fetches the embedded objects. The web server always encrypts the actual objects using K1, so that the hub proxy cannot read the base HTML page data. The hub proxy transfers the embedded objects to the client together at one time. Thus the HTTP proxy functionality is preserved in DSSL while maintaining end-to-end security of the HTML page contents.

The performance of Layered IPSEC with IKE modifications have been analyzed through simulations in OPNET Modeler. The simulation setup consisted of a remote client connected to a server via a satellite link. All communication between the client and the server passed through the remote and satellite hub TCP PEPs. The satellite link delay was 130 milli-seconds, uplink bandwidth was 256 kbps and the downlink bandwidth was 70 Mbps.

Figure 4:
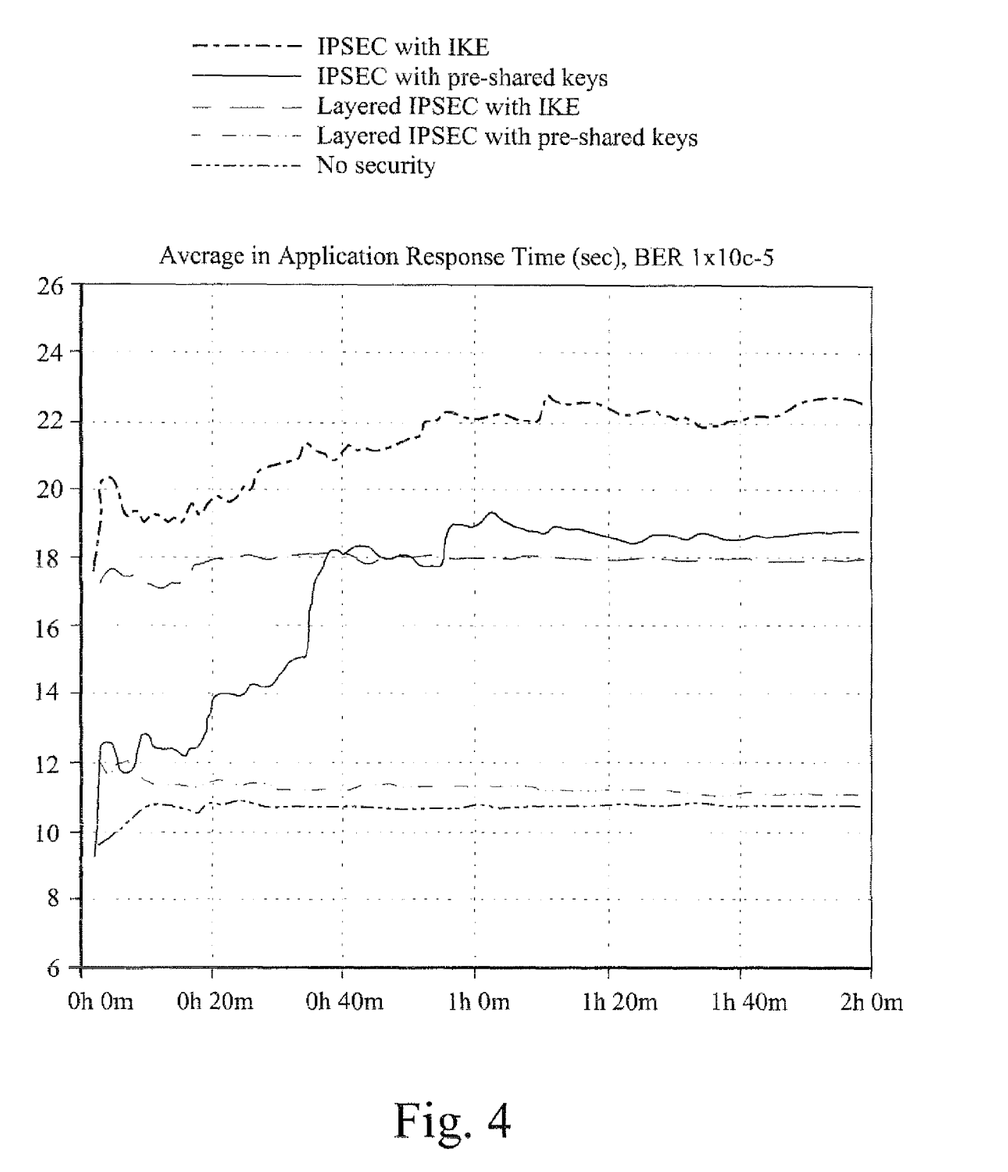
FIG. 4 shows a comparison of the application response time for LES and IPSEC.

FIG. 4 shows that the application response time for LES is significantly better than that of IPSEC, both when IKE and pre-shared keys are used. (In all the graphs, X-axis is the simulation time in minutes; Y-axis is the application response time in seconds.) This is because when IPSEC is used, the TCP optimizations are not working and therefore TCP considers the channel error to be signs of congestion and thus goes into recovery mode quicker. The graphs also indicate that using IKE adds significantly higher delay compared to using pre-shared keys. This is due to the multiple message exchanges between the client, the server and the PEPs that are needed by IKE to establish the secure channel. Each message exchange goes over the satellite links and adds to the overall delay. In fact, the delay for LES with pre-shared keys is nearly as low as that of unsecured data transmission with full TCP optimization, which has the lowest delay. The slightly higher delay for the former is primarily due to the IPSEC processing overhead at the nodes, and the slight transmission overhead due to the larger packet sizes due to LES headers and trailers. The effect of TCP optimizations is so pronounced that the lack of optimizations can have a greater effect on the overall delay than the IKE overhead. This is illustrated by the delay graph of IPSEC with pre-shared keys, which starts out much lower compared to LES with IKE (as can be expected), but it climbs higher when the un-optimized TCP in the former case runs into channel errors.

Figure 5:
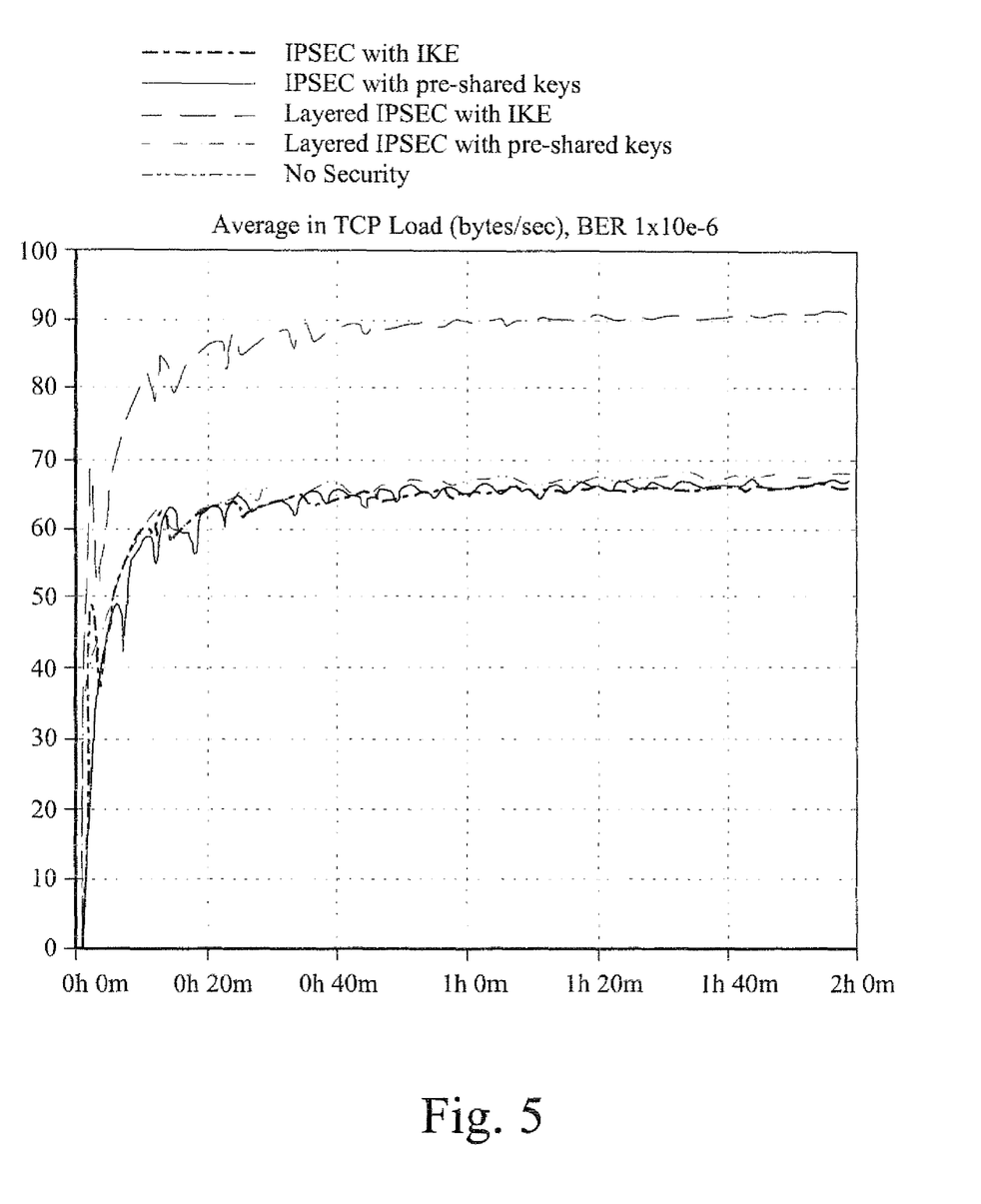
FIG. 5 shows a comparison between the average TCP load due to LES with IKE and other cases.

FIG. 5 shows that the average TCP load due to LES with IKE is much higher than the other cases. At simulation time 1 hour 40 minutes, the LES TCP load is 89.938562 bps, which is 42% higher than the TCP load for unsecured transmission (63.333333 bps), and 37.7% higher that IPSEC with IKE (65.318627 bps). However, this high overhead is mostly due to IKE. In the case of LES with pre-shared keys, the TCP load is 66.686275 bps at simulation time 1 hour 40 minutes. This is only 1.1% higher than IPSEC with pre-shared keys (65.941176 bps), and 5.3% higher than unsecured transmission.

The results indicate that Layered IPSEC can be a viable alternative to IPSEC for satellite networks, with comparable byte overhead while providing significant improvement in application performance. However, this holds true only if the secure channel is established apriori. While using IKE will still result in improved application response times for high channel error conditions, it might introduce unacceptably high overhead even with the proposed modifications.

The performance of the DSSL protocol and associated web browsing was analyzed by OPNET simulations. The setup was similar to that described above, with the difference being that HTTP proxy servers are used in place of the TCP PEP servers. We conducted simulations for different scenarios— (i) unsecured web browsing with functional HTTP proxy, (ii) SSL security and hence non-operational HTTP proxy and (iii) DSSL security with HTTP proxy functional.

Figure 6:
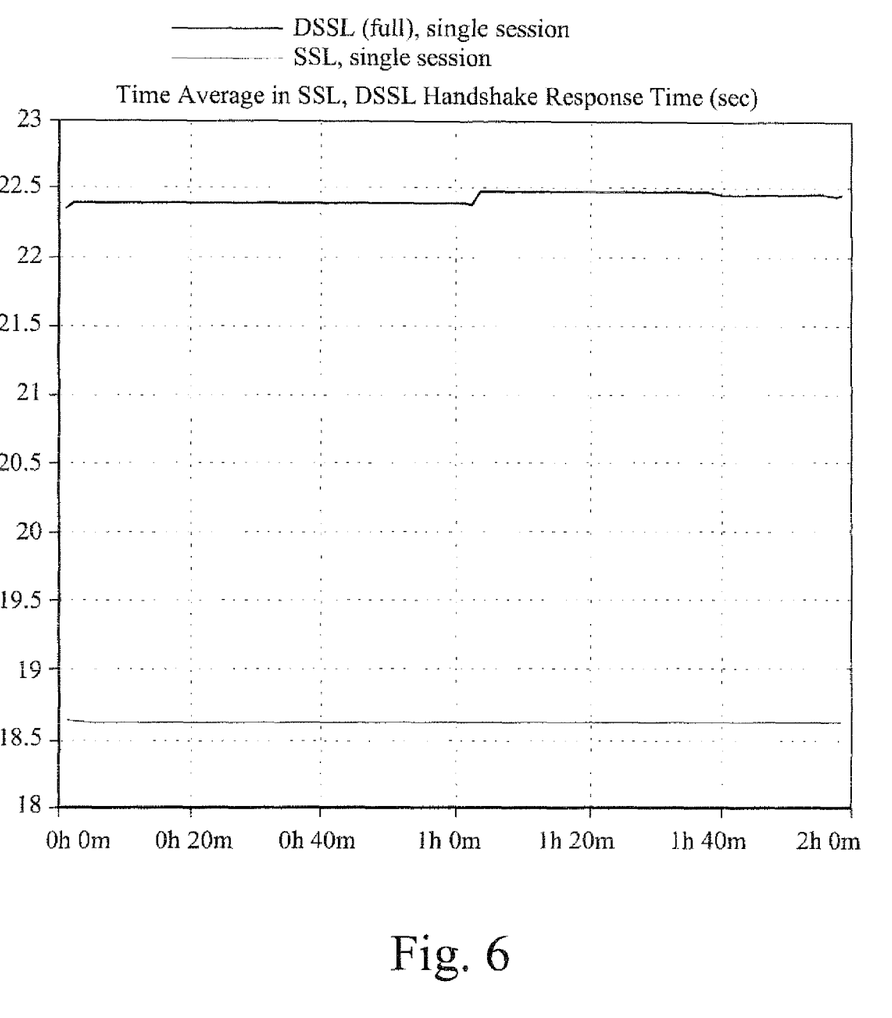
FIG. 6 shows a comparison of the response times for completing the DSSL handshake against the SSL handshake.

FIG. 6 compares the response times for completing the DSSL handshake against the SSL handshake. The graph highlights the delay overhead of DSSL due to the additional steps of the client communicating with the proxy server in DSSL stages 1, 3 and 5, and the proxy server contacting the web server in stage 4. The DSSL overhead ranges between 20.3% and 20.74% over the SSL handshake delay.

To reduce the high delay involved in DSSL handshake, it was proposed to use a condensed version of DSSL, in which the handshake consists of only the first two stages. In the first stage, the client contacts the HTTP proxy and exchanges each other's digital certificate. Subsequently, the client contacts the web server. Once the client and the web server have established the security parameters in stage 2 of DSSL, the client makes the first HTTP GET request. This request goes through the HTTP proxy and triggers the proxy to send its certificate to the web server, and a request for the DSSL session secondary keys. The HTTP proxy request is piggy-backed on the client HTTP GET request. The server responds to the client request with the base webpage in a HTTP POST response. In addition, the server responds to the proxy key request with its own certificate and the DSSL secondary session keys, encrypted with the proxy's public key. This response to the proxy is piggy-backed on the HTTP response to the client. The proxy receives the combined response from the web server and is thus able to retrieve the secondary session keys from the encrypted message, using its private key. Consequently, it is able to decrypt the relevant portions of the HTTP POST response and therefore can perform the HTTP acceleration. We refer to this variant of DSSL as DSSL two-phase.

The first stage in DSSL two-phase is necessary in the situation that the client and the HTTP proxy server do not share any security association beforehand. However, if the two entities are apriori aware of each other's security information (via their digital certificates), then this phase is not needed. Every time the client contacts a web server to initiate a secure web session, it passes to the web server a locally cached copy of the HTTP proxy's certificate. The DSSL protocol can thus be further reduced to just one stage, that of stage 2. The DSSL secondary session key is transmitted to the HTTP proxy piggybacked on the first response from the server, as described in the DSSL two-phase. We refer to this optimization of the DSSL protocol as DSSL quick mode.

Figure 7:
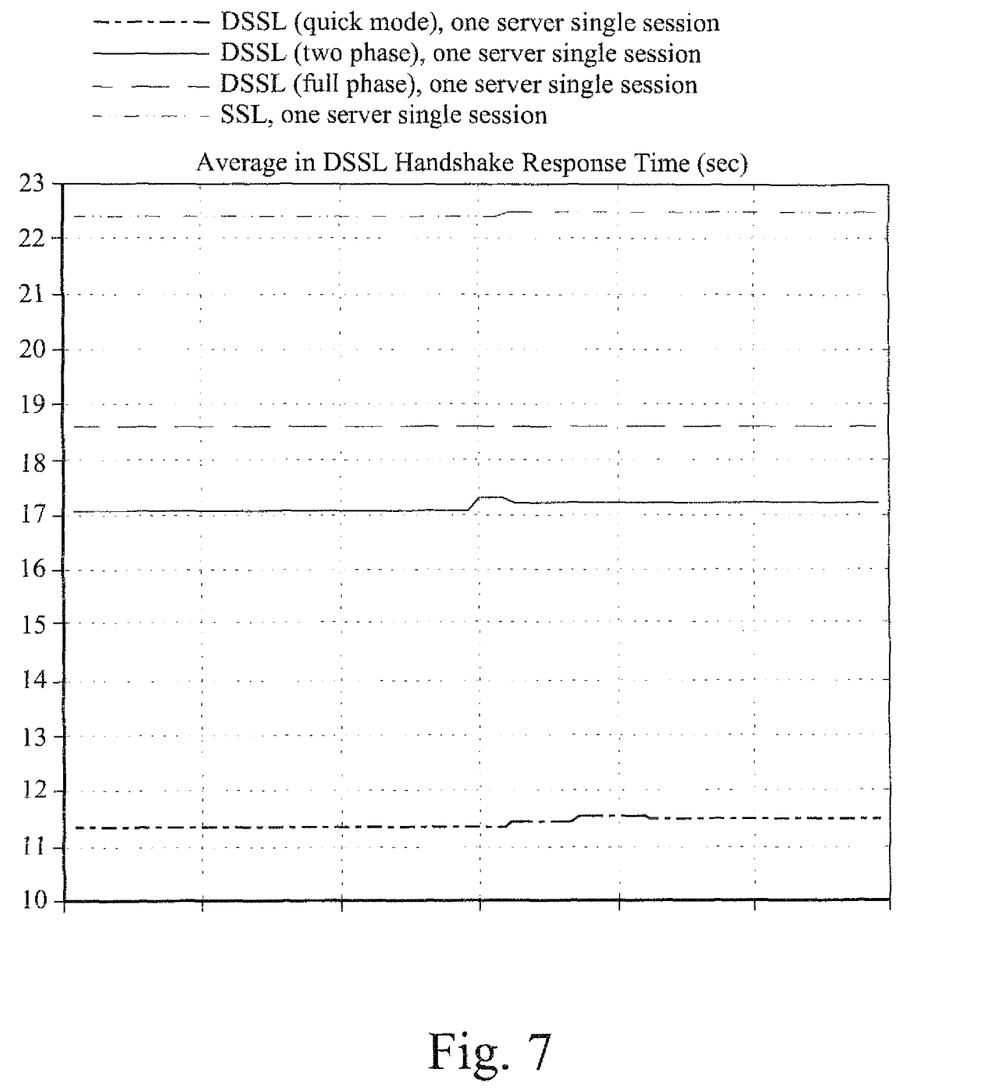
FIG. 7 shows a comparison of the response times for various DSSL handshake versions.

FIG. 7 compares the response times of DSSL handshake for its various versions. At simulation time 1 hour and 20 minutes, DSSL quick mode handshake time is 33% less than DSSL two-phase (11.5 seconds and 17.2 seconds, respectively). The quick mode time is nearly half (48.8% less) than the handshake time for full version of DSSL (22.465 seconds), and is 38.8% less than that of SSL (18.61 seconds).

Figure 8:
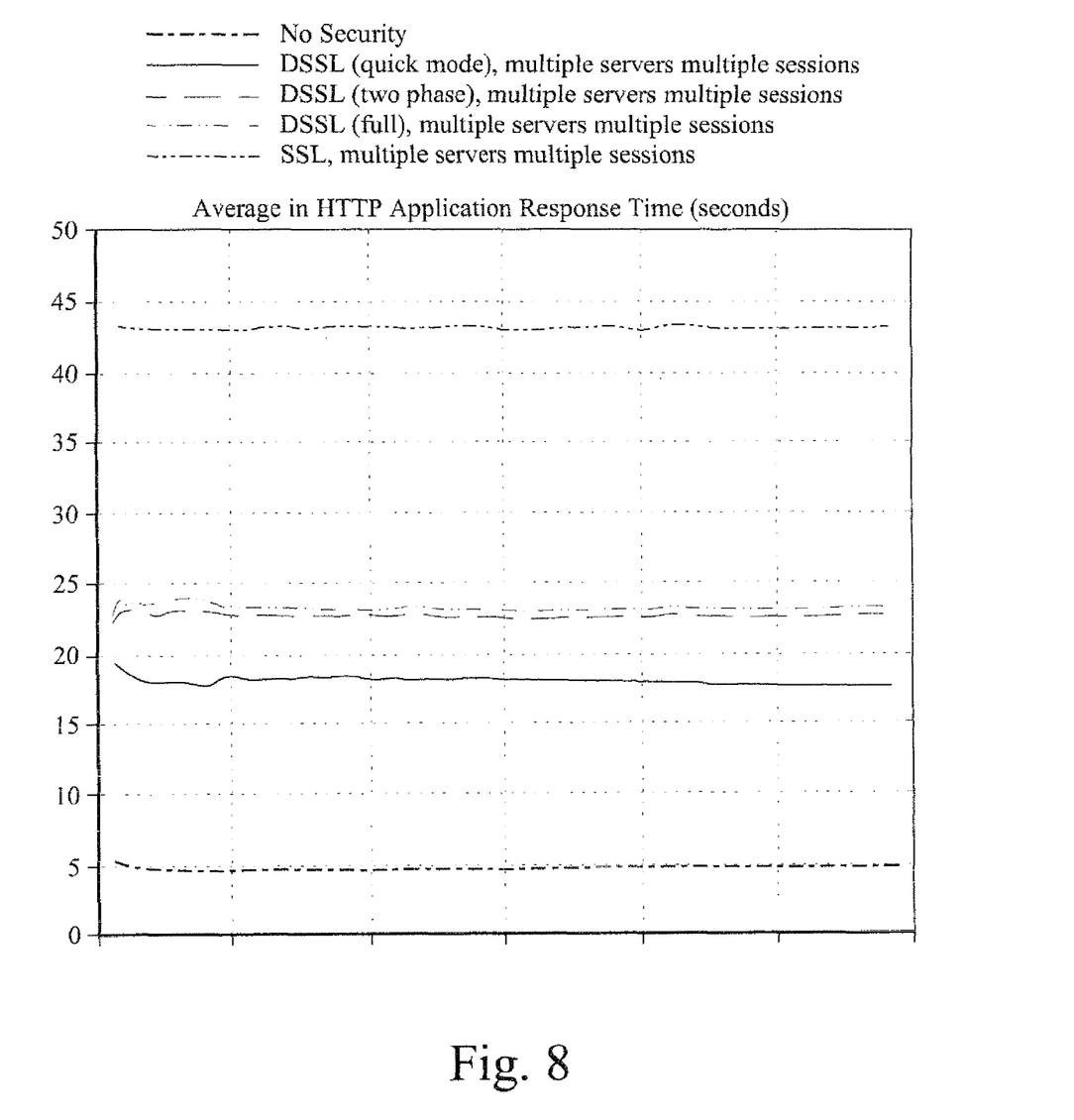
FIG. 8 shows a comparison of the application response times for multiple secure browsing sections with multiple servers.

The optimizations in DSSL two-phase or DSSL quick mode are proposed to overcome the detrimental effect of the long propagation delay of the satellite channel on the DSSL handshake protocol. This optimization however requires further changes to the HTTP protocol, to allow piggy-backing the DSSL secondary keys on the initial HTTP exchanges between the client, the web server and the proxy server. FIG. 8 compares the application response times for multiple secure browsing sessions with multiple servers. The times for all cases of DSSL are much lower than that for SSL, and are comparable to unsecured web browsing. The additional delay is primarily due to the security overhead at the different nodes to maintain the secure session and to encrypt/decrypt the traffic.

Two solutions to the IPSEC problem have been proposed in the prior art. The first approach is to move the TCP PEP gateways to the endpoints. The TCP optimizations are done on the traffic in the clear, and then the traffic is encrypted using IPSEC. This approach improves the performance, but when a packet is lost or received in error, TCP goes into congestion avoidance phase and the transmission is reduced in half. The second approach is to split the secure connection into two at the satellite gateway. This allows the gateway to decrypt the IPSEC packet and read the headers and thereby do performance optimizations. However, this requires trust in the satellite gateway and might be unacceptable to users who require strong end-to-end security.

Several modified TCP protocols have also been proposed that perform better compared to the original specification in the event of channel errors or delay, or when IPSEC is used. See, E. Olechna, P. Feighery, and S. Hryckiewicz, "Virtual private network issues using satellite based networks," in *Military Communications Conference (MILCOM)* 2001, vol. 2, 2001, pp. 785-789.

The problem of HTTP proxy performance with SSL has been addressed by the industry by breaking up the end-to-end single SSL connection between client and server into multiple SSL connections. In this solution, the client browser creates a secure HTTP connection with the Remote Page Accelerator (RPA) at the client satellite terminal, a second connection is created between the RPA and the Hub Page Accelerator (HPA), and a third connection is between the HPA and the server. The RPA performs all necessary handshaking with the client browser. The HPA can decrypt the SSL traffic from the server and perform the desired object prefetching. The major drawback of this scheme is that it requires a high level of trust in the intermediate nodes, which might be unacceptable when absolute end-to-end security is desired.

The DSSL concept is partly similar to the multiple-channel SSL concept. However, there is no encryption differentiation for primary and secondary SSL records—it is suggested that HTTP traffic with lower security requirements be encrypted entirely with keys known to intermediate nodes. For security requirements in the described exemplary implementations that approach would be unacceptable.

The adverse effects of IPSEC and SSL on unicast communication in satellite networks are solved by the use of layered IPSEC with modified IKE for securing unicast communication while allowing performance optimization algorithms to function simultaneously. Also proposed is the use of the DSSL protocol with three variations, to replace SSL for secure HTTP in hybrid satellite networks. Simulations have shown that the performance of the proposed protocols compare favorably to standard IPSEC and SSL in hybrid networks.

While the foregoing written description of the inventions enables one of ordinary skill in the art to make and use what is considered presently to be the preferred implementations and best mode, those of ordinary skill will understand and appreciate the existence of variations, combinations, and equivalents of the specific implementation methods, and examples described herein. The inventions should therefore not be limited by the above described implementations, including methods, apparatuses, and examples, but by all such implementations within the scope and spirit of the appended claims.

What is claimed:

1. A computer implemented method for securing end-to-end communication in hybrid satellite networks, comprising:

establishing, by a client node, a connection with a server node in a hybrid satellite network, wherein a first proxy node is associated with the client node and a second proxy node is associated with the server node;

sending, by the client node and to the server node, a first certificate corresponding to the first proxy node during Internet Key Exchange (IKE) protocol message exchange for dynamic establishment of session keys for use in subsequent Internet Protocol Security (IPSEC) encryption;

receiving, at the client node and from the server node, a second certificate corresponding to the second proxy node during the IKE protocol message exchange;

obtaining, by the client node and based upon exchanging the first certificate and the second certificate with the server node, an additional pair of keys for encryption and authentication of messages using the first and second proxy nodes during the subsequent IPSEC encryption, wherein the additional pair of keys are obtained in addition to four primary keys generated during IKE protocol message exchange for encryption and authentication by the client and server nodes during the subsequent IPSEC encryption; and distributing, by the client node, the additional pair of keys to the first proxy node during the IKE protocol message exchange.

2. The computer implemented method according to claim 1, comprising:

receiving, at the server node and from the client node, the first certificate corresponding to the first proxy node during the IKE protocol message exchange;

sending, by the server node and to the client node, the second certificate corresponding to the second proxy node in response to receiving the first certificate;

obtaining, by the server node and based upon exchanging the first certificate and the second certificate with the client node, the additional pair of keys for encryption and authentication of messages using the first and second proxy nodes during the subsequent IPSEC encryption; and distributing, by the server node, the additional pair of keys to the second proxy node during the IKE protocol message exchange.

3. The method of claim 1, wherein the subsequent IPSEC encryption is operable to encrypt Internet Protocol (IP) packets that are exchanged between the client and server nodes, and
wherein the four primary keys are used for encryption and authentication of a Transmission Control Protocol (TCP) payload included in the IP packet, while the additional pair of keys are used for encryption and authentication of an IP header and a TCP header included in the IP packet.

4. The method of claim 3, wherein the first and second proxy nodes are operable to decrypt and authenticate the IP and TCP headers included in the IP packet using the additional pair of keys.

5. The method of claim 3, wherein the client and server nodes are operable to decrypt and authenticate the TCP payload included in the IP packet using the four primary keys.

6. The method of claim 1, wherein sending the first certificate by the client node and to the server node comprises:
sending, by the client node and to the server node, the first certificate corresponding to the first proxy node during a first phase of the IKE protocol message exchange; and
receiving, at the client node and from the server node, the second certificate corresponding to the second proxy node during the first phase of the IKE protocol message exchange.

7. The method of claim 6, wherein obtaining the additional pair of keys by the client node comprises:
obtaining, by the client node and based upon exchanging the first certificate and the second certificate with the server node during the first phase of the IKE protocol message exchange, the additional pair of keys during a second phase of the IKE protocol message exchange, wherein the four primary keys are generated during the second phase of the IKE protocol message exchange; and
distributing, by the client node, the additional pair of keys to the first proxy node during the second phase of the IKE protocol message exchange.

8. The method of claim 7, wherein the first phase of the IKE protocol message exchange includes an aggressive mode of the IKE protocol message exchange, and wherein the second phase of the IKE protocol message exchange includes a quick mode of the IKE protocol message exchange.

9. A computer implemented method for securing end-to-end communication in hybrid satellite networks, comprising:
establishing, by a client node, a first connection with a HTTP proxy node in a hybrid satellite network, wherein a HTTP proxy node is associated with a server node;
sending, by the client node and to the HTTP proxy node, a first certificate corresponding to the client node;
receiving, at the client node and from the HTTP proxy node, a second certificate corresponding to the client node, wherein the second certificate is received at the client node in response to sending the first certificate;
obtaining, by the client node, a public key associated with the HTTP proxy node from the second certificate;
establishing, by the client node, a Secure Socket Layer (SSL) connection with the server node;
sending by the client node and to the server node, the first certificate corresponding to the client node and the second certificate corresponding to the HTTP proxy node during a handshake phase of the SSL connection;
generating, by the client node, primary and secondary keys during the handshake phase of the SSL connection, wherein the primary key is used for encrypting HTML pages included in IP packets during data exchange using the SSL connection and the secondary key is used for encrypting object links included in the IP packets;
sending, by the client node, the primary and secondary keys to the server node during the handshake phase of the SSL connection; and
sending, by the client node and to the HTTP proxy node, instructions to obtain keys for the SSL connection from the server node.

10. The method of claim 3, comprising:
establishing, by the HTTP proxy node and based upon receiving instructions from the client node, a second connection with the server node;
sending, by the HTTP proxy node and to the server node, the second certificate corresponding to the HTTP proxy node;
receiving, at the HTTP proxy node, the secondary key from the server node; and
sending, by the HTTP proxy node and to the client node, a confirmation indicating receipt of the secondary key from the server node.

11. The method of claim 10, comprising:
receiving, at the server node and during data exchange using the SSL connection, a secure HTTP (HTTPS) request from the client node;
retrieving, by the server node, a requested HTML page in response to the HTTPS request;
extracting, by the server node, embedded object links from the requested HTML page;
generating, by the server node, a new HTML page including the extracted object links;
generating, by the server node, a first SSL record by encrypting the requested HTML page using the primary key, and a second SSL record by encrypting the new HTML page using the secondary key; and
sending, by the server node and to the client node, an IP packet including the first record and the second record as a response to the HTTPS request.

12. The method of claim 11, comprising:
receiving, at the HTTP proxy node, the IP packet sent by the server node to the client node;
decrypting, by the HTTP proxy node, the second SSL record using the secondary key;
obtaining, by the HTTP proxy node, the object links included in the second SSL record;
sending, by the HTTP proxy node and to the server node, requests to pre-fetch the objects corresponding to the object links included in the second SSL record;
receiving, at the HTTP proxy node and from the server node, the objects corresponding to the object links included in the second SSL record based on sending the requests to pre-fetch the objects; and
forwarding, by the HTTP proxy node and to the client node, the objects corresponding to the object links included in the second SSL record that are received from the server node based on sending the requests to pre-fetch the objects.

13. The method of claim 11, comprising:
receiving, at the client node, the IP packet sent by the server node;
decrypting, by the client node, the first SSL record using the primary key; and
obtaining, by the client node, the requested HTML page included in the first SSL record.

14. A computer implemented method for securing end-to-end communication in hybrid satellite networks, comprising:
   generating, by a client node during an Internet Key Exchange (IKE) protocol message exchange with a server node in a hybrid satellite network for dynamic establishment of session keys for use in subsequent Internet Protocol Security (IPSEC) encryption, four first IPSEC keys for encryption and authentication by the client and server nodes during the subsequent IPSEC encryption and a pair of second IPSEC keys for encryption and authentication of messages using a first proxy node and a second proxy node during the subsequent IPSEC encryption, wherein the first proxy node is associated with the client node and the second proxy node is associated with the server node;
   distributing, by the client node, the pair of second IPSEC keys to the first proxy node during the IKE protocol message exchange;
   generating, by the client node, first and second SSL keys during a handshake phase of a Secure Socket Layer (SSL) connection with the server node, wherein the first SSL key is used for encrypting HTML pages included in IP packets during data exchange using the SSL connection and the second SSL key is used for encrypting object links included in the IP packets;
   sending, by the client node, the first and second SSL keys to the server node during the handshake phase of the SSL connection; and
   sending instructions, by the client node and to an HTTP proxy node, to obtain keys for the SSL connection from the server node, wherein the HTTP proxy node is associated with the server node.

15. The computer implemented method according to claim 14, wherein generating by the client node the four first IPSEC keys and the pair of second IPSEC keys during the IKE protocol message exchange with the server node comprises:
   establishing, by the client node, a connection with the server node;
   sending, by the client node and to the server node, a first certificate corresponding to the first proxy node during the IKE protocol message exchange;
   receiving, at the client node and from the server node, a second certificate corresponding to the second proxy node during the IKE protocol message exchange; and
   obtaining, by the client node and based upon exchanging the first certificate and the second certificate with the server node, the pair of second IPSEC keys.

16. The method of claim 15, comprising:
   receiving, at the server node and from the client node, the first certificate corresponding to the first proxy node during the IKE protocol message exchange;
   sending, by the server node and to the client node, the second certificate corresponding to the second proxy node in response to receiving the first certificate;
   obtaining, by the server node and based upon exchanging the first certificate and the second certificate with the client node, the pair of second IPSEC keys; and
   distributing, by the server node, the pair of second IPSEC keys to the second proxy node during the IKE protocol message exchange.

17. The method of claim 14, wherein generating by the client node the first and second SSL keys during the handshake phase of the SSL connection with the server node comprises:
   establishing, by the client node, a first connection with the HTTP proxy node;
   sending, by the client node and to the HTTP proxy node, a first certificate corresponding to the client node;
   receiving, at the client node and from the HTTP proxy node, a second certificate corresponding to the client node, wherein the second certificate is received at the client node in response to sending the first certificate;
   obtaining, by the client node, a public key associated with the HTTP proxy node from the second certificate;
   establishing, by the client node, the SSL connection with the server node;
   sending, by the client node and to the server node, the first certificate corresponding to the client node and the second certificate corresponding to the HTTP proxy node during the handshake phase of the SSL connection; and
   generating, by the client node, the first and second SSL keys during the handshake phase of the SSL connection.

18. The method of claim 17, comprising:
   establishing, by the HTTP proxy node and based upon receiving instructions from the client node, a second connection with the server node;
   sending, by the HTTP proxy node and to the server node, the second certificate corresponding to the HTTP proxy node;
   receiving, at the HTTP proxy node, the second SSL key from the server node; and
   sending, by the HTTP proxy node and to the client node, a confirmation indicating receipt of the second SSL key from the server node.

19. The method of claim 18, comprising:
   receiving, at the server node and during data exchange using the SSL connection, a secure HTTP (HTTPS) request from the client node;
   retrieving, by the server node, a requested HTML page in response to the HTTPS request;
   extracting, by the server node, embedded object links from the requested HTML page;
   generating, by the server node, a new HTML page including the extracted object links;
   generating, by the server node, a first SSL record by encrypting the requested HTML page using the first SSL key, and a second SSL record by encrypting the new HTML page using the second SSL key; and
   sending, by the server node and to the client node, an IP packet including the first record and the second record as a response to the HTTPS request.

20. The method of claim 19, comprising:
   receiving, at the HTTP proxy node, the IP packet sent by the server node to the client node;
   decrypting, by the HTTP proxy node, the second SSL record using the second SSL key;
   obtaining, by the HTTP proxy node, the object links included in the second SSL record;
   sending, by the HTTP proxy node and to the server node, requests to pre-fetch the objects corresponding to the object links included in the second SSL record;
   receiving, at the HTTP proxy node and from the server node, the objects corresponding to the object links included in the second SSL record based on sending the requests to pre-fetch the objects; and
   forwarding, by the HTTP proxy node and to the client node, the objects corresponding to the object links included in the second SSL record that are received from the server node based on sending the requests to pre-fetch the objects.

* * * * *